July 29, 1952 H. W. McPHERSON 2,604,633

DISPOSAL DEVICE

Filed June 13, 1951 5 Sheets-Sheet 1

INVENTOR.

Hal Weir McPherson

BY

Mann, Brown, and Hansmann

Attys.

INVENTOR.
Hal Weir McPherson
BY
Mann, Brown and Hansmann
Attys.

INVENTOR.
Hal Weir McPherson
BY
Mann Brown and Hansmann
Attys

INVENTOR.
Hal Weir McPherson.
BY
Mann, Brown and Hansmann
Attys.

July 29, 1952 H. W. McPHERSON 2,604,633

DISPOSAL DEVICE

Filed June 13, 1951 5 Sheets-Sheet 5

INVENTOR.

Hal Weir McPherson

BY

Mann, Brown and Hansmann

Attys.

Patented July 29, 1952

2,604,633

UNITED STATES PATENT OFFICE 2,604,633

DISPOSAL DEVICE

Hal Weir McPherson, Chicago, Ill.

Application June 13, 1951, Serial No. 231,414

19 Claims. (Cl. 4—10)

This invention relates to disposal devices for sewage and garbage, and has for its principal object to make water operate a grinder, wash out the device, and also carry away the refuse.

Other objects and advantages of the invention will appear as the disclosure proceeds.

Figure 2:
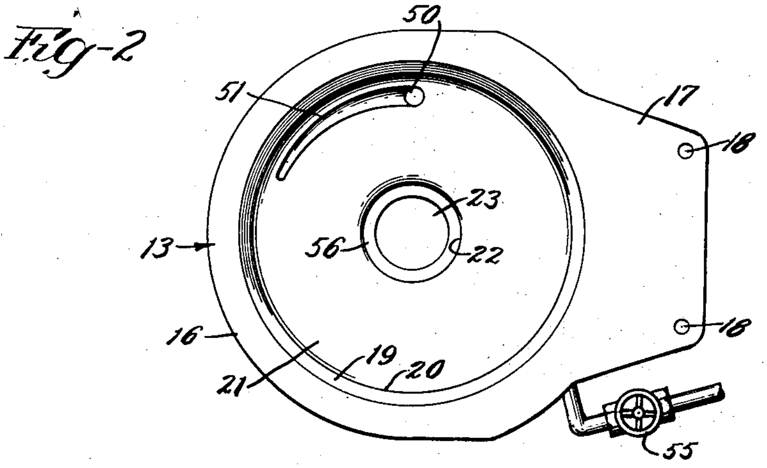
Fig. 2 is a plan view looking at the top of Fig. 1.

In Figs. 1–8, 10 indicates a base casing, shown as a generally cylindrical receptacle, open at the top and having a out-turned bottom flange 11 and an out-turned top flange 12. Mounted on and extending partly within the receptacle is a toilet bowl, generally indicated by 13, provided with an annular seat 14 to receive the top flange of the receptacle, to which the bowl is secured by cap screws 15.

The bowl has an out-turned flange 16 at the top extending to the rear, as indicated by 17 (Figs. 1 and 2), and provided with openings 18 for the hinge bolts of the toilet seat, not shown.

The upper portion 19 of the bowl 13 is frusto-conical at a fairly steep slope, which blends at 20 with a lower frusto-conical portion 21 of less steep slope, which terminates in a cylindrical portion 22 forming a discharge opening or outlet 23 leading into the receptacle 10.

Beneath the bowl and within the receptacle is a grinder or comminuter, generally indicated by 24, and composed of an upper stationary member 25 and a lower rotating member 26. The upper stationary member is made fast to the cylindrical lower portion 22 of the bowl by cap screws 27, and in effect forms a continuation of the discharge opening 23, with which it is aligned.

The stationary grinder member 25 is of hollow, frusto-conical form, increasing in diameter downwardly. It is provided with a series of cutting or grinding teeth having edges 28 and outwardly sloping faces 29 in series around the inner surface of the element.

The lower rotary grinder element 26 is frusto-conical at a less steep slope, and is provided with cutting teeth having edges 30 and sloping faces 31 extending outwardly in a series around its grinding surface.

Figure 5:
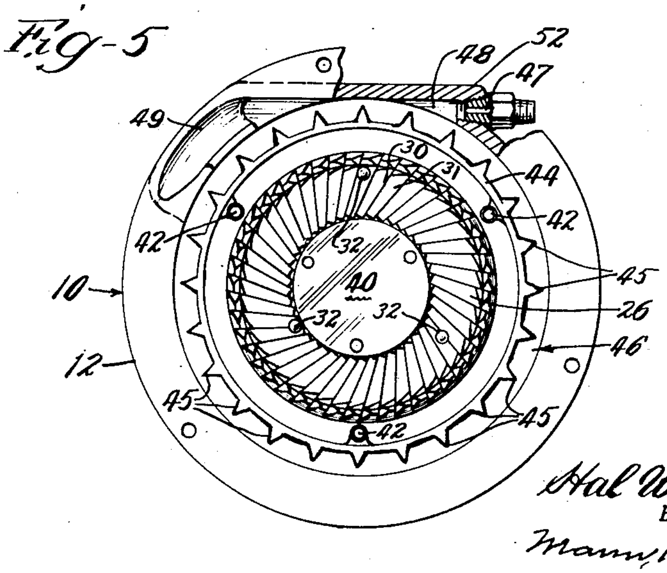
Fig. 5 is a plan view of the base receptacle or casing, a fragment being broken away to show the water connection.
Figure 6:
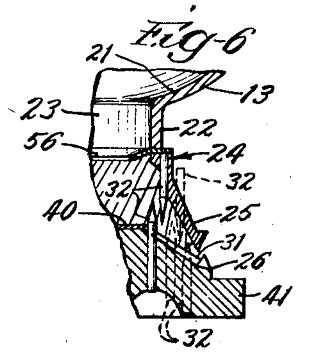
Fig. 6 is an enlarged vertical section through fragments of the grinder.

Each of the grinding or comminuting elements is also provided with a series of sharp, pointed cutting spikes 32, here shown as three in number in each, and distributed, equiangularly (as shown in Fig. 5), from the inner to the outer portions of the cooperating grinding surfaces so as to pass close to each other in operation, as suggested in Fig. 6. The spikes are here shown as pointed rods pressed into suitable openings in the two members.

The difference in slope of the grinding or comminuting surfaces of the two members forms a tapering path or course for the material to be acted upon, which becomes narrower as the sloping teeth work the material downwardly and outwardly between the surfaces.

The stationary and rotary grinding elements combine three specific actions in comminuting the material passing between them. The grinding teeth 30 on the two elements are inclined in opposite directions so that they not only grind the material, but move it downwardly and outwardly. The cooperating spikes 32 in the two elements act as shredders and tend to tear apart the waste material, being particularly effective with paper. The peripheral margins of the two grinding elements have interfitting teeth, as best shown at 31' in Fig. 4, and these peripheral teeth serve to sever material that has passed between the grinding elements and is about to be discharged into the cavity 46.

The rotating grinder element 26 is journalled on anti-friction bearings 33 on an upright shaft or mast 34 having its lower portion tightly fitted in an opening 35 in the bottom 36 of the receptacle 10 and adjusted for height by a plug 37 in a threaded enlargement 38 of the hole 35.

The bearings 33 are within a cylindrical portion 39 forming a sort of hub for rotating the grinding element, which extends well below the lower of the anti-friction bearings 33 and is hermetically closed at the top by a disk 40 so that rising water in the casing 10 cannot reach the bearings 33. This bearing mount is the subject matter of my application, Serial No. 80,510, filed March 9, 1949, the disclosure of which application is incorporated herein by reference.

The rotating grinding element is provided with an annular extension 41, which serves as a flywheel and a support for a series of vertical rods 42 secured at their upper ends 43 to the rig 44 of a water wheel or motor equipped with triangular, flat-faced vanes or elements 45 extending outwardly and upwardly from the rim, and constituting in effect a Pelton wheel.

The water motor is arranged within a cavity, generally indicated by 46, between and defined by the cylindrical wall of the casing 10 and the walls 21 and 22 of the bowl spaced from it, together with the stationary element 25 of the grinder, which, in effect, forms an extension of the bowl discharge.

Water for driving the water wheel is supplied by a nozzle 47 (Figs. 5 and 7), which delivers into a channel 48 substantially tangential to the water wheel and leading to an upwardly curved channel 49 (Figs. 5, 7 and 8), which in turn leads to an opening 50 in the bowl 19, which, in turn, leads to a curved channel 51 in the bowl.

Figure 7:
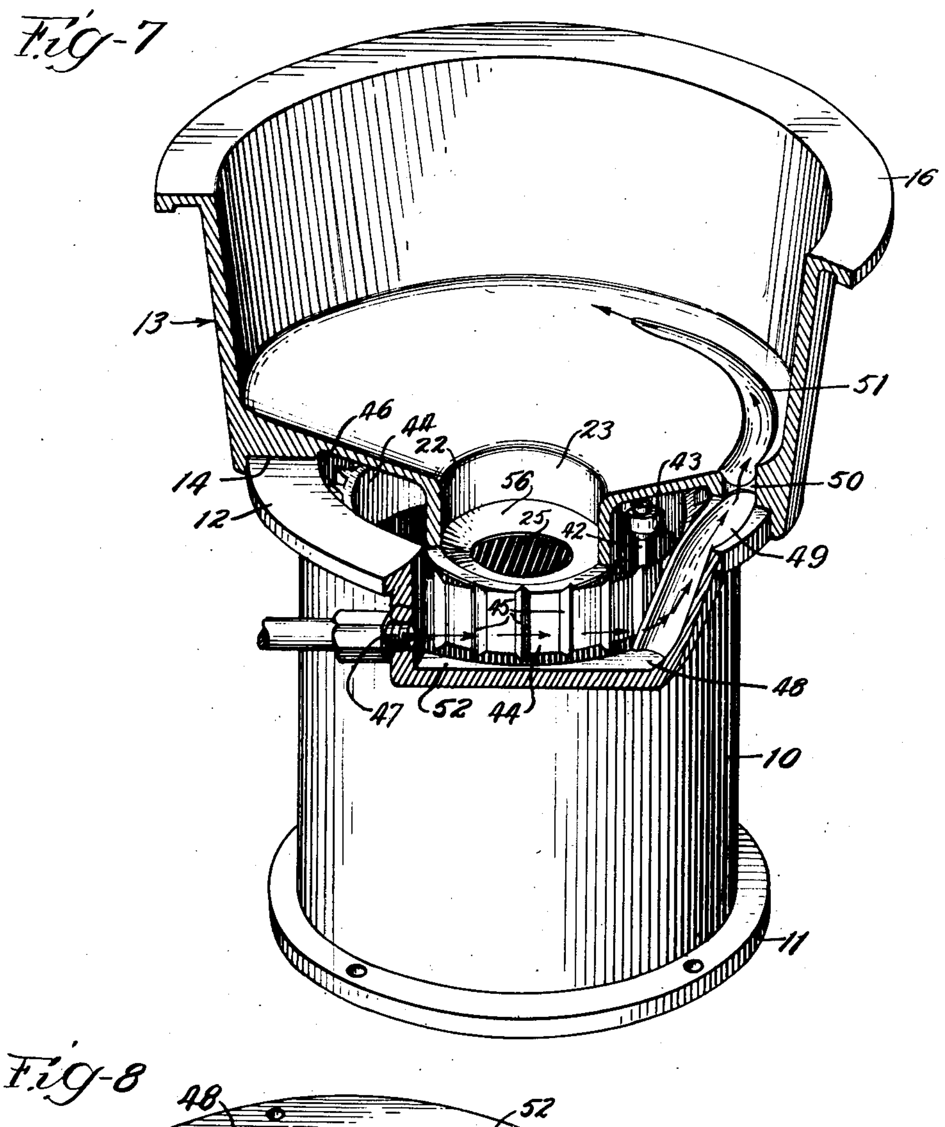
Fig. 7 is an enlarged perspective view with parts broken away to show the path of the water for driving the hydraulic motor and flushing out the device.
Figure 8:
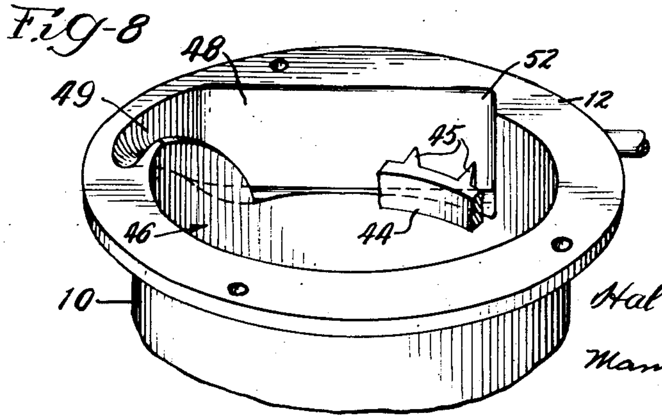
Fig. 8 is a perspective view of the upper portion of the base receptacle looking from the opposite side of Fig. 7.

The channels 48 and 49 are formed within an enlargement 52 on the side of the cylindrical receptacle 10, just below the top flange 12, the walls of which appear in Fig. 5 and are broken away in Fig. 7 to reveal the path of the water.

The bottom 36 of the receptacle 10 is somewhat concavo-convex and provides between it and the wall of the receptacle a sloping discharge channel 53 extending around the bottom next to the wall of the receptacle, and leading to a discharge outlet 54 for the liquid and refuse.

Figure 1:
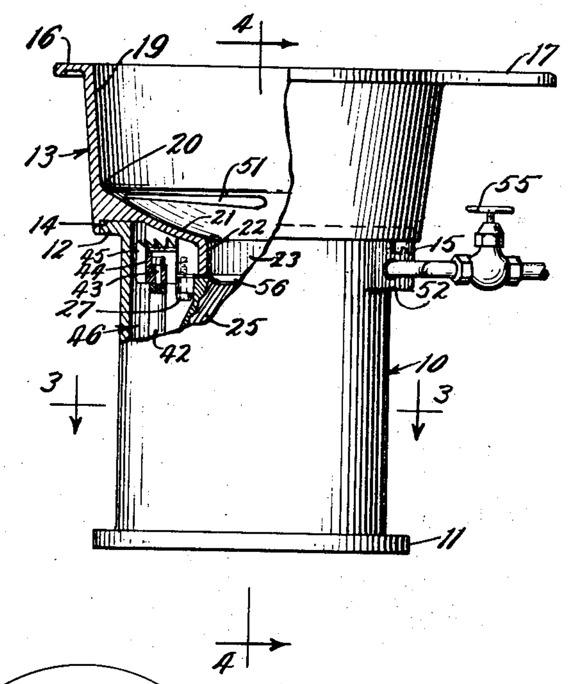
Fig. 1 is a side elevation of a preferred form of disposal device, parts being removed to show the interior.
Figure 3:
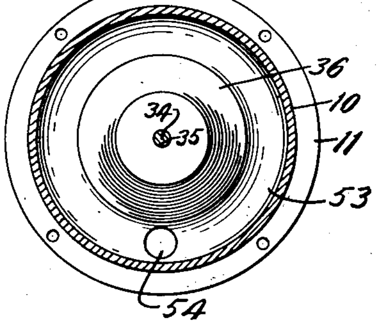
Fig. 3 is a section taken on the line 3—3 of Fig. 1.

In operation, water is turned on by opening a valve, diagrammatically indicated at 55 in Figs. 1 and 2, admitting water under suitable pressure to the nozzle 47, from which it rushes into the channel 48, impinges upon the vanes 45 of the water wheel, a portion of it falling down into the receptacle and a portion entering the channel 49 and rushing upwardly through the opening 50 into the groove 51 in the bowl 13, which it encircles in a spiraling course, passing out the discharge opening 23 into the tapering chamber between the grinding elements, and washing the bowl and the grinder to remove all solid matter.

As it passes from the grinder into the receptacle, the water is given a whirling motion, which it continues in the lower portion of the circle, passing around the sloping channel 53 and out through the outlet 54.

In its course through the device, it picks up the solid matter, which is thoroughly disintegrated in the grinder and mixed with oxygen, with the result that there is a liquid effluent, which approximates the effluent leaving a septic tank. It will not clog a sewer or pipe, and can even be disposed of through a garden hose.

The action in the device creates a strong down draft in the bowl, which ventilates the toilet room and removes odors.

It is helpful to have the water passing from the discharge of the bowl at 23 into the grinder fall on the central portion of the rotating element, and thus be given a strong outward direction by centrifugal force, so as to pass through the constricted portion of the grinder with a thorough cleaning effect.

As here shown, the discharge opening 23 is provided with a frusto-conical flange 56, which may be integral with the bowl or secured thereto by bolts 27 that make the stationary grinding element fast. The flange 56 serves to prevent upward splashing of effluent.

The location of the outlet 54 is very important. In normal operation, the water used to drive the Pelton wheel falls by gravity to the lower part of the casing 10 but is held against the inner side walls by centrifugal action. The effluent discharged by the comminuter is also thrown against the side walls of the casing 10, and is swirled in the same direction along the inner side walls as it falls toward the bottom of the casing. By locating the outlet 54 in the bottom of the casing with its axis in a vertical plane, slightly spaced from the side wall of the casing 10, gravity acts substantially alone in removing the effluent from the casing, and hence undesirable pressures in the connected sewer line are avoided.

Figure 11:
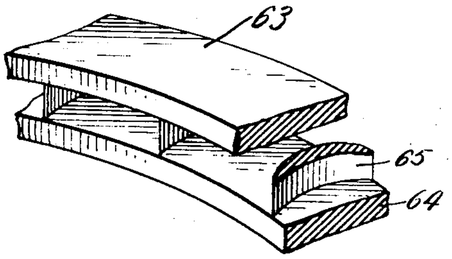
Fig. 11 is a perspective view of a portion of the water motor.
Figure 10:
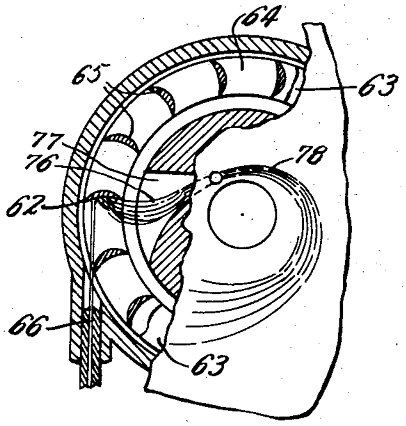
Fig. 10 is a fragmentary section on the line 10—10 of Fig. 9.
Figure 9:
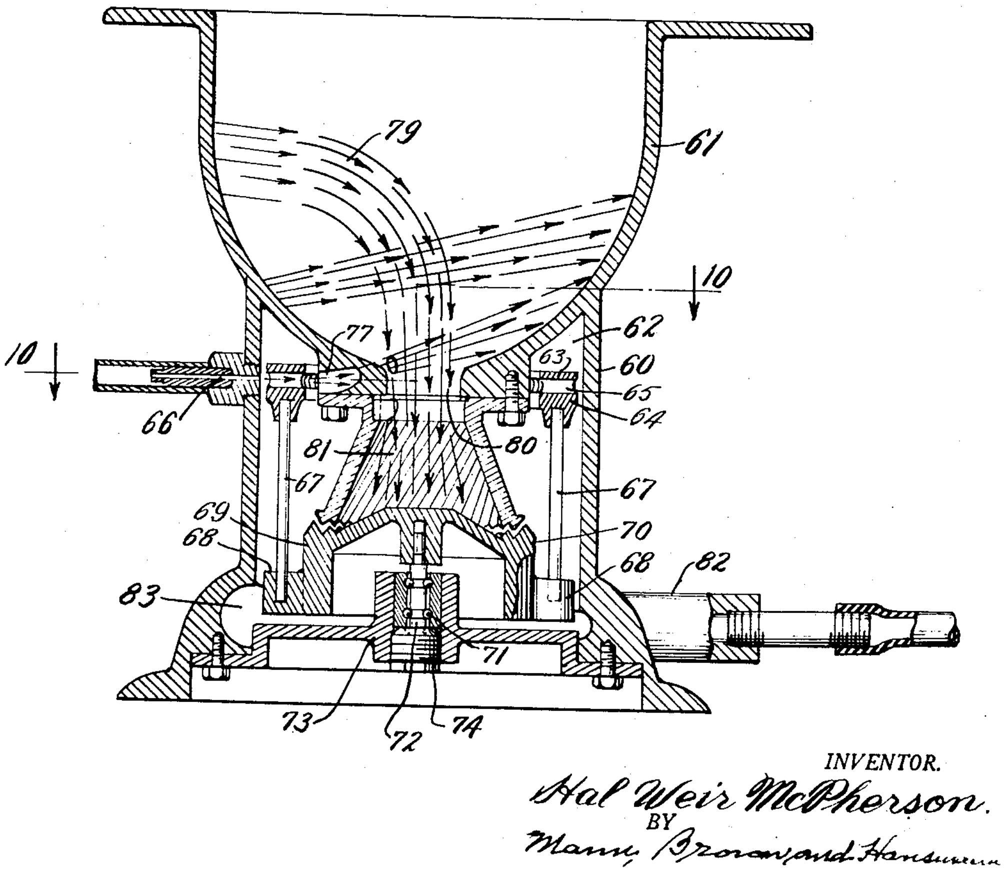
Fig. 9 is a vertical section through a modified form of disposal device.

In the modification shown in Figs. 9, 10 and 11, the base receptacle 60 and the bowl 61 are made integral and are provided with spaced walls to define a cavity 62 corresponding to the cavity 46 in the first modification.

That cavity accommodates a rim portion of a Francis turbine composed of spaced rings 63 and 64 connected by curved vanes 65 adapted to receive water from a jet 66 entering through the side wall of the receptacle 60.

The rim of the Francis turbine is fixed to the upper ends of rods 67, which extend upwardly from arms 68 on a flywheel 69 forming part of the rotatable grinding element 70, journalled on anti-friction bearings 71 on a shaft 72, adjustably mounted in a removable bottom element 73 by a plug 74.

Water from the jet 66 striking the vanes 65, as indicated in Fig. 10, has a portion deflected as indicated at 76, which passes through a duct 77 leading inwardly and upwardly into the bowl 61 to deliver the water in a somewhat tangential direction, indicated by 78, from which it takes a spiral course around the bowl, as indicated by arrows 79, and eventually drops through the outlet 80, as indicated by arrows 81, passing through the grinder into the lower portion of the receptacle 60 and out through the discharge 82.

The bottom of the receptacle is provided with a tapering channel 83 leading to the outlet 82; and the arms 68 on the flywheel act as impellers to force the liquid effluent outwardly, and thus pump it through the outlet 82.

Figure 12:
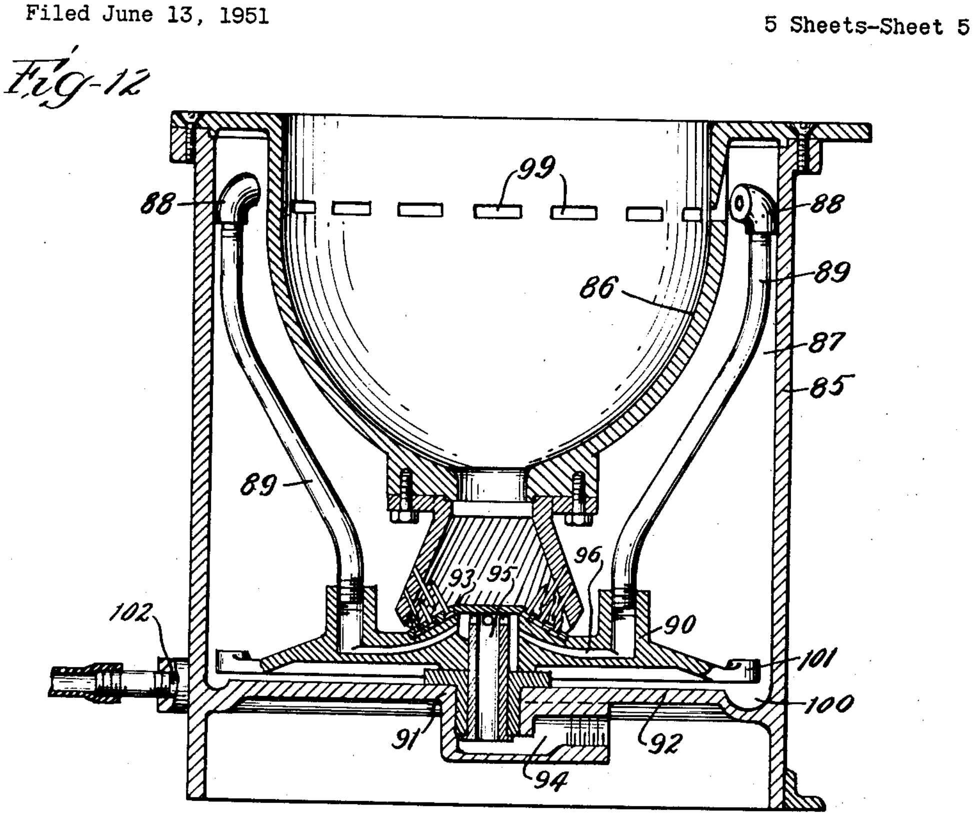
Fig. 12 is a vertical section through another modified form of the device.
Figure 13:
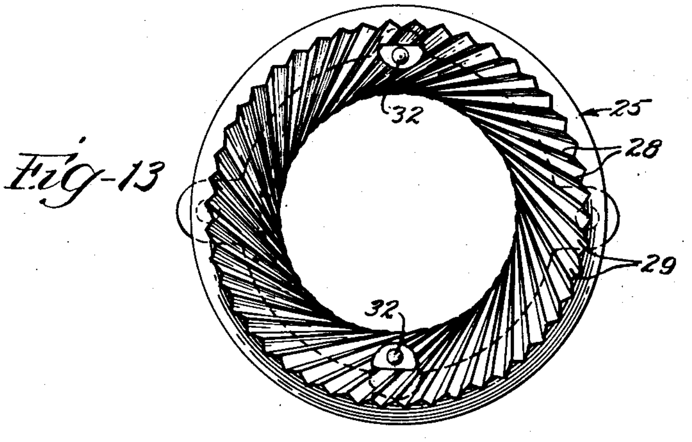
Fig. 13 is an inverted plan view of the fixed member of the grinder.

In the modification shown in Fig. 12, the walls of the receptacle 85 and the bowl 86 define a cavity 87 to accommodate the nozzles 88 of a reaction turbine and the supporting pipes 89, which are mounted on a flywheel 90 and journalled in a bearing generally indicated at 91 in the bottom 92 of the receptacle, and equipped with rotating grinder surfaces 93.

Water is supplied through an inlet 94 in the bottom, and passes through a hollow shaft 95 and the ducts 96 to the pipes 98.

Water issuing from the nozzles 88 strikes the wall of the bowl 86, which is equipped with slots 99 leading into the bowl, and thus supplying it with a series of charges of flush water.

Water leaving the bowl passes through the grinder and out into the bottom of the receptacle, which is provided with a tapering annular groove 100, swept by impellers 101 on the flywheel, and leading to a discharge 102.

Figure 4:
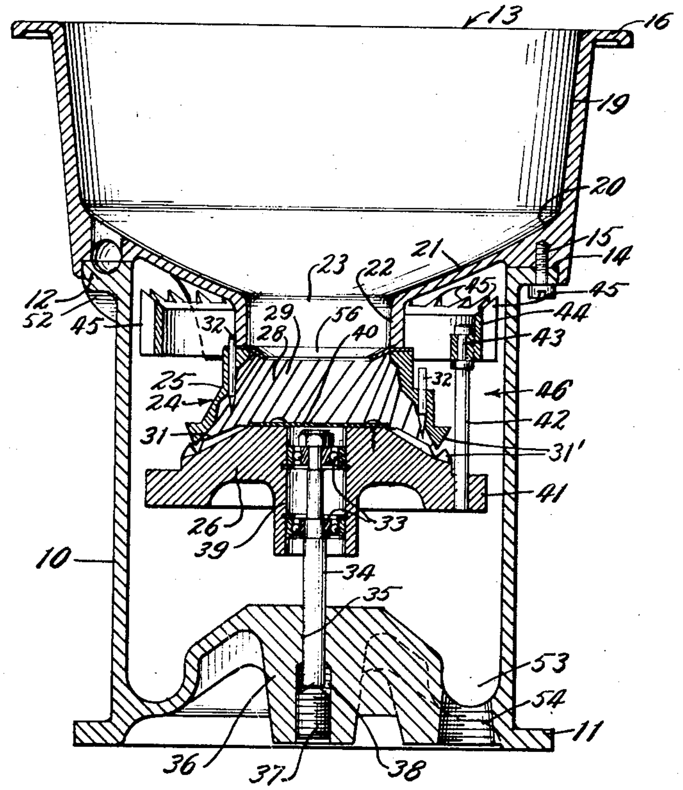
Fig. 4 is an enlarged vertical section taken on the line 4—4 of Fig. 1.

In the modifications of Figs. 9–12 inclusive, undesirable pumping action into the sewerage line may be avoided by relocating the outlets 82 and 102 to correspond with the outlet 54 in Fig. 4, or even radially inwardly thereof, so that the flow through the outlet is caused by gravity alone, rather than centrifugal force. Normally the outlet should communicate with the largest and deepest area of the channels or grooves 83 and 100 to obtain the best drainage.

These several embodiments are deemed sufficient to indicate the variety of forms of which the invention is capable.

This application is a continuation-in-part of my applications, Serial No. 706,730, filed October 30, 1946, now abandoned, and Serial No. 13,971, filed March 10, 1948, now abandoned, the disclosures of which are specifically incorporated herein by reference, to the extent that they are not inconsistent with the present disclosure.

I claim:

1. A disposal device comprising a receptacle open at the top and having the sides and bottom thereof in watertight relationship, a bowl at least in part within said open top of the receptacle and spaced from it to define a cavity between the walls thereof, said bowl having an opening at the bottom, a stationary comminuting member having an inlet communicating with said opening in the bowl, a rotary comminuting member rotatably supported beneath said stationary comminuting member and in spaced relation thereto, and hydraulic motor means in said cavity operatively connected with said rotary comminuting member to drive it.

2. A disposal device comprising a receptacle, a bowl having a wall within and spaced from the receptacle to define a cavity between them, said bowl having an opening at the bottom registering with a stationary grinder below it, a rotary grinder spaced from the stationary grinder, hydraulic motor means for driving the rotary grinder and having vane elements in said cavity between the receptacle and the bowl, means for directing water under pressure against said vanes to actuate the motor means, said bowl having at least one opening to admit water from the motor means into the bowl, and impellers rotatable with the rotary grinder to act upon the water and material passing between the grinders.

3. A disposal device comprising a receptacle, a bowl having an opening in the bottom thereof supported in and in spaced relation with the side of said receptacle, a comminuting member in communicating relation with the said opening in the bowl, a rotary comminuting member in spaced relation to the first comminuting member, opposed grinding teeth on said members positioned to effect an outward shearing on particles therebetween, hydraulic motor means having vanes between the bowl and the side of the receptacle and connected to the rotary comminuting member, and means for directing water to said hydraulic motor means to rotate the same.

4. A disposal device comprising a toilet bowl having an outlet, a supporting receptacle for the bowl defining a cavity within the wall thereof, comminuting means having an opening registering with the outlet of the bowl, hydraulic motor means for actuating said comminuting means and having vane elements in said cavity, means cooperating with said hydraulic motor means to use water from said hydraulic motor means to wash said bowl, and pump means having one element thereof associated with said comminuting means and another element associated with said receptacle.

5. A disposal device comprising a toilet bowl having an outlet, a receptacle therefor having the sides thereof spaced from said bowl to form a cavity, stationary grinding means having an inlet registering with the outlet of the bowl, rotary grinding means in spaced relation with said stationary grinding means and cooperating therewith, a flywheel secured to said rotary grinding means, hydraulic motor means for said rotary grinding means having vane elements in the cavity between the bowl and the receptacle, means connecting the hydraulic motor means and the flywheel, means directing water under pressure to said hydraulic motor means, and impellers driven by the flywheel to urge water and comminuting material from said receptacle.

6. A disposal device comprising a receptacle having sides and bottom in watertight relationship, a bowl in said receptacle and supported thereby with a cavity between the walls thereof, said bowl having an opening in the bottom, a stationary comminuting surface having an inlet in registration with the opening in the bowl, a rotary comminuting surface in said receptacle in spaced relation with the stationary comminuting surface, and hydraulic motor means in said cavity operably connected with said rotary comminuting surface to rotate the same.

7. A disposal device comprising a receptacle, a bowl having an opening in the bottom thereof supported in and in spaced relationship with the side of said receptacle, a stationary grinding member in communicating relation with the opening in the bowl, a rotatable grinding member in spaced relation thereto, opposed grinding teeth on said grinding members, hydraulic motor means having vane elements in the space between the bowl and the side of the receptacle to drive said rotary comminuting member, and means for directing water to said hydraulic motor means to rotate the same.

8. A disposal device comprising a receptacle, a bowl supported therein with a cavity therebetween, said bowl having an opening in the bottom registering with a stationary grinder below it, a rotary grinder in spaced relation to the stationary grinder, hydraulic motor means having vane elements within the cavity between the bowl and the receptacle for driving the rotary grinding member, means directing water under pressure to actuate the hydraulic motor means, and means to conduct water from said motor means into said bowl.

9. A disposal device comprising a toilet bowl, a receptacle therefor defining a cavity with the wall thereof, said bowl having an outlet at the bottom, grinding means having an opening registering with said outlet of the bowl, hydraulic motor means having vanes in the channel between the bowl and the receptacle and driving said grinding means, and means cooperating with said hydraulic motor means to use water therefrom to wash said bowl.

10. A disposal device comprising a receptacle, a bowl having a bottom opening supported in spaced relationship with the side of the receptacle to form a cavity, a stationary comminuting member in communicating relationship with the opening in the bowl, a rotary comminuting element in spaced relation to the stationary comminuting element, teeth on said comminuting elements, and hydraulic motor means for driving the rotary comminuting element and having vane elements in the cavity between the receptacle and the bowl.

11. A disposal device comprising a bowl having a bottom opening, a rotary grinding device positioned beneath said opening and adapted to receive waste material through said opening, hydraulic motor means operatively connected with said rotary grinding device to actuate it, and means for channelling water discharged from said hydraulic motor means to said bowl for flushing the same.

12. A disposal device comprising a bowl having a bottom opening, a receptacle positioned beneath said opening and having a portion extending above the bottom opening and joining the bowl to form an annular channel about the lower part of the bowl, a rotary grinding device in the receptacle adapted to receive waste material through said opening, and hydraulic motor means operatively connected with said grinding device to actuate it, said motor means including an impeller rotating in said annular space.

13. A disposal device comprising a bowl having a bottom opening, a grinding device beneath said opening and adapted to receive waste material through said opening, hydraulic motor means operatively connected to said grinding device to actuate it, said grinding device including a stationary member and a rotary member, said members having oppositely sloping teeth cooperating to force material outwardly to the periphery of the device, and a plurality of intercalated spikes mounted on said member.

14. A disposal device comprising a hollow casing having a bottom provided with an outlet, a bowl attached to and extending within said casing member defining a cavity between sections of the respective walls, a central aperture in said bowl member, a hollow member provided with a grinding surface rigidly secured to said bowl in registry with said aperture to provide an unrestricted passage therethrough, a rotatably mounted member provided with a grinding surface in spaced relation with said grinding surface of said hollow member, an annular rim connected with said rotatably mounted member, a plurality of projections extending from said annular rim, means for directing a stream of water under pressure tangential to said annular rim and against said projections, and arcuate means for directing a portion of the water from said projections into said bowl.

15. A disposal device comprising a hollow casing having a concave bottom defining an annular recess with the side wall of said casing and provided with an outlet from said annular recess, a member rotatably supported by said bottom member and provided with a grinding surface, a bowl extending into said hollow casing member and defining an annular cavity between portions of the side walls thereof, a water wheel positioned in the annular cavity between the side walls of said bowl and casing member and connected to said rotatable member, a channel in the side wall of said casing member adjacent to the water wheel, means for introducing water under pressure into said channel, an arcuate aperture in said bowl registering with said channel to divert water from the water wheel into the bowl, a central aperture in said bowl, a hollow member having a grinding surface therein positioned to register with said central aperture and rigidly secured to said bowl to provide an unrestricted passage from said bowl into the said casing member, and a baffle positioned in said passage.

16. A disposal device comprising a bowl, a hollow casing receiving the bowl and having an outlet in the bottom thereof, a cavity defined by the side walls of said bowl and said casing, a water wheel rotatably positioned in said cavity, a central aperture in said bowl, a hollow stationary grinding member secured to said bowl in a manner to provide an unrestricted passage from said bowl to said hollow supporting member, a rotary grinding member connected with said water wheel and positioned in spaced relation to said stationary grinding member, means for directing water against said water wheel to actuate the same, means for directing a portion of the water into said bowl, and a baffle to direct a portion of the water in said bowl into the center of the rotary grinding member.

17. A bowl, a support for said bowl, a cavity defined by the side walls of said bowl and said support, a water wheel rotatably positioned in said cavity, an unrestricted central passage from said bowl into said support, stationary grinding teeth in said passage, rotary grinding teeth in spaced relationship with the stationary grinding teeth and secured to said wheel, hydraulic means for actuating said water wheel, an arcuate channel for introducing water into said bowl when said wheel is actuated, and a bottom member to said support having an outlet therein.

18. A disposal device comprising a casing and a bowl with spaced walls defining an annular cavity, a grinder in the casing below the bowl, a water motor in said cavity for driving the grinder, means for delivering propelling water to the water motor, and means for diverting some of said water into the bowl to flush it and the grinder.

19. A disposal device comprising a casing and a bowl with spaced walls defining an annular cavity, a grinder member rotatably mounted in the casing below the bowl, a water motor in said cavity carried by and driving said grinder element, means for delivering propelling water to the water motor, and means for diverting some of said water into the bowl to flush it.

HAL WEIR McPHERSON.

REFERENCES CITED

The following references are of record in the file of this patent:

UNITED STATES PATENTS

| Number | Name | Date |
|---|---|---|
| 1,174,656 | Beckwith | Mar. 7, 1916 |
| 2,431,161 | Bjorklund | Nov. 18, 1947 |